United States Patent [19]
Nohara et al.

[11] 3,882,259
[45] May 6, 1975

[54] LAMINATE OF ETHYLENE/VINYL ALCOHOL COPOLYMER, ETHYLENE/VINYL ACETATE COPOLYMER AND POLYOLEFINS

[75] Inventors: Shigezo Nohara; Shunsaku Hirata, both of Yokohama; Jinichi Yazaki, Kawasaki; Toru Suzuki, Yokosuka, all of Japan

[73] Assignee: Toyo Seikan Kaisha Ltd., Tokyo, Japan

[22] Filed: Mar. 30, 1973

[21] Appl. No.: 347,406

[30] Foreign Application Priority Data
Aug. 8, 1972 Japan ............................. 47-78732

[52] U.S. Cl. .......... 428/35; 260/78.5 T; 260/897 R; 264/171; 428/516
[51] Int. Cl. ..................... B32b 27/08; B32b 31/30
[58] Field of Search .................. 161/252, 254, 256; 260/78.5 T; 264/171

[56] References Cited
UNITED STATES PATENTS

| | | | |
|---|---|---|---|
| 3,524,795 | 8/1970 | Peterson | 161/252 X |
| 3,547,754 | 12/1970 | Tokos et al. | 161/252 X |
| 3,552,638 | 1/1971 | Quackenbush | 161/252 X |
| 3,560,325 | 2/1971 | Sogi et al. | 161/252 X |

*Primary Examiner*—George F. Lesmes
*Assistant Examiner*—P. C. Ives
*Attorney, Agent, or Firm*—Wenderoth, Lind & Ponack

[57] ABSTRACT

A laminated composite sheet suitable for use as a packing sheet and a hollow container comprises an intermediate layer composed of an ethylene-vinyl alcohol copolymer and two outer layers bonded to the opposite sides of the intermediate layer, each of the outer layer being composed of polyolefins. An ionomer or an ethylene-vinyl acetate copolymer is incorporated into at least one of the intermediate layer and two outer layers for the purpose of improving the resistance to permeation of gas and moisture and to improve the bonding force between the layers.

9 Claims, 1 Drawing Figure

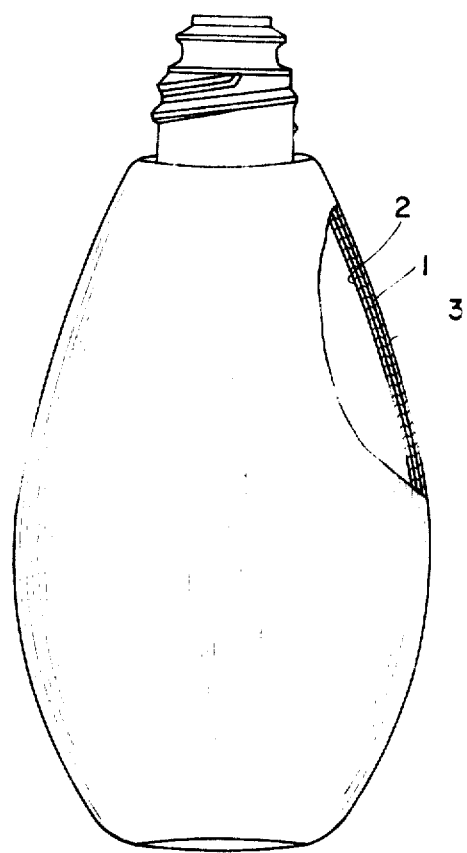

LAMINATE OF ETHYLENE/VINYL ALCOHOL COPOLYMER, ETHYLENE/VINYL ACETATE COPOLYMER AND POLALEFINS

BACKGROUND OF THE INVENTION

This invention relates to a laminated composite sheet suitable for use as packing sheets and containers and consisting essentially of polyolefin thermoplastic resinous materials.

Products of plastics are now widely used in many applications. However, processing of such products after they have been used presents a serious problem.

Usual methods of processing such discards of plastics involve regeneration for reuse, decomposition and liquidization, burying them under ground and burning.

Among various plastics, polyolefins such as polyethylene and polypropylene have a high calorie of combustion and generate gas consisting essentially of $H_2O$ and $CO_2$ when burned under a proper condition. However, since these gases do not pollute the atmosphere, it may be said that the discards of such polyolefins are easy to process.

Although the water resistant property, the moisture proof property and the resistance to liquid permeation of polyolefins are generally high, their permeability to gas such as oxygen is large so that they are not suitable for use as containers and packing sheets for foods, medical compounds, cosmetics and the like which should be contained in containers impermeable to gas and moisture.

SUMMARY OF THE INVENTION

It is an object of this invention to provide an improved laminated composite sheet having a low permeability to gas and moisture so that it is suitable to be used as a packing sheet and a container.

Another object of this invention is to provide an improved composite sheet which can be burned after use without generating any harmful gas.

Still another object of this invention is to provide a laminated composite sheet wherein laminated layers are bonded together with a strong bonding force.

Generally speaking, the invention provides a laminated composite sheet comprising an intermediate layer composed of an ethylene-vinyl alcohol copolymer and two outer layers bonded to the opposite sides of the intermediate layer, each of the outer layers being composed of polyolefins.

According to another aspect of this invention, there is provided a laminated composite sheet comprising an intermediate layer composed of an ethylene-vinyl alcohol copolymer and two outer layers bonded to the opposite sides of the intermediate layer, each of the outer layers being composed of polyolefins, and at least one of the intermediate layer and the outer layers being mixed with at least one member selected from the group consisting of an ionomer and an ethylene-vinyl acetate copolymer.

The ionomer and ethylene-vinyl acetate copolymer incorporated into the intermediate layer or one or both of the outer layers not only improve the resistance of the composite sheet to permeation of gas and moisture but also increases the bonding force between the laminated layers.

The multi-layer packing material of this invention is manufactured by melting thermoplastic materials containing two or more ingredients by using two or more extruders, laminating and fusing together a plurality of layers of resins of different compositions in a chamber in a die at the end of the extruder, extending a multi-layer fused sheet from the extruder, and then cooling and solidifying the sheet. Hollow containers are prepared by blowing parisons out of the extruded multi-layer fused sheet and then moulding the parisons. Thus, according to this invention, layers of the sheet are laminated and fused together before extrusion and are not laminated after extruding the individual layers. For this reason, it is not necessary to use any bonding agent between adjacent layers. This can be accomplished by incorporating a polymer into one or both of adjacent layers of the plastics having a relatively small bonding force thereby increasing the bonding strength between adjacent layers when they are directly laminated and fused together.

Respective layers of the novel laminated composite sheet have the following compositions: The intermediate layer is comprised by an ethylene-vinyl alcohol copolymer ( for example, a copolymer sold under a trademark of EVAL ) which is characterized by its extremely high gas barrier property ( for example, low permeability to oxygen ). However, such an ethylene-vinyl alcohol copolymer has a relatively high permeability to moisture. To solve this difficulty, according to this invention, layers of polyolefins such as polyethylene, polypropylene or the like are applied on both sides of the intermediate layer for the purpose of protecting the intermediate layer. Although the ethylene-vinyl alcohol copolymer layer and layers of polyethylene of polypropylene adhere each other to some extent, the bonding force is not sufficiently large to ensure commercial use.

According to this invention, at least one or both of a special ionomer such as Surlyn A ( Trademark ) and an ethylene-vinyl acetate copolymer are incorporated into either one or both of the above described intermediate layer and outer layers for enhancing the bonding strength between these layers.

The ionomer utilized in this invention comprises a polymer wherein organic and inorganic components are bonded together by a covalent bond and an ionic bond and is available on the market under a trademark of Surlyn A, for example. Such ionomer can be prepared by adding a hydroxide of such metals as sodium, potassium, magnesium and zinc, or alcoholate or a lower aliphatic acid to an ethylene polymer copolymerized with a small quantity of a monomer ( for example, acrylic acid ) containing a carboxyl group in its side chain for neutralizing most of the acid groups. Thus, the carboxyl anions distributed along the chain of the molecule electrostatically bond with the metal cations presenting between the molecules to form a type of bridge.

More particularly, the ionomer utilized in this invention is a socalled polymer containing metal ion of a major proportion of an olefin monomer and a minor proportion of a monomer containing ethylenic unsaturated carboxyl radical, and such a polymer containing metal ion is characterized in that a portion of the carboxyl radical is neutralized by metal ions such as sodium ions.

For example, a polymer containing metal ion selected from the group consisting of a copolymer of a major proportion of ethylene, a minor proportion of acrylic acid and acrylic acid neutralized by sodium ions and a copolymer of a major proportion of ethylene, a minor proportion of methacrylic acid and methacrylic acid neutralized by sodium ions is used. Above described olefin monomer and unsaturated acid monomer are copolymerized by the action of an ordinary free radical catalyst. A composition consisting of about 96 mole percent of olefin and 4 percent of acid monomer is preferred.

As will be described later in connection with the example an ethylene-vinyl acetate copolymer containing about 10 percent of vinyl acetate was found to give satisfactory results, but it should be understood that the ratio of the monomers is not limited to that described above. The ethylene-vinyl acetate copolymer is prepared by copolymerizing an ethylene monomer and a vinyl acetate monomer with a conventional free radical catalyst in a manner well known in the art.

When incorporating a special ionomer or an ethylene-vinyl acetate copolymer into an ethylene-vinyl alcohol copolymer comprising the intermediate layer, it is advantageous to add from 1 to 30 parts of the special ionomer or ethylene-vinyl acetate copolymer to 100 parts of the ethylene-vinyl alcohol copolymer ( in this specification, all parts are weight parts ). Increase of the quantity of the ionomer or the ethylene-vinyl acetate copolymer beyond said proportion increases the bonding force between the intermediate layer and the outer layers but impairs the gas barrier property of the composite sheet. Where the ionomer or the ethylene-vinyl acetate copolymer is incorporated into the polyolefins comprising the outer layers it is advantageous to incorporate from 0.1 to 15 parts of the ionomer or the ethylene-vinyl acetate copolymer to 100 parts of the polyolefins. In this case, when the quantity of the ionomer or the ethylene-vinyl acetate copolymer is increased beyond the proportion just mentioned the bonding force between the intermediate layer and the outer layers is increased, but the low permeability property to moisture of the polyolefins is decreased. Where the ionomer or the ethylene-vinyl acetate copolymer is incorporated into both the intermediate layer and the outer layers it is possible to increase the bonding forces between these layers without imparing the desirable characteristics of the resins constituting respective layers than the case when the ionomer or the ethylene-vinyl acetate copolymer is incorporated to either one of the intermediate layers and the outer layers. In order to preserve the desired gas barrier property of the ethylene-vinyl alcohol copolymer it is advantageous to incorporate a relatively small amount ( for example, less than 10 parts ) of the ionomer or ethylene-vinyl acetate copolymer to the intermediate layer and to incorporate a relatively large amount into the outer layers. The object and advantages of this invention cannot be attained when the ionomer or the ethylene-vinyl acetate copolymer is added in amount less than the lower limit described.

Pigment or other additives may be added to the intermediate and other layers. Further, the intermediate layer may contain a certain amount of the resin comprising the outer layers and vice versa. For example, the outer layers may consist of 100 parts of polyolefins and 0.5 to 10 parts of ethylene-vinyl alcohol copolymer.

Although the two outer layers are not necessarily be of the same composition, in a case where the two outer layers may be made of the same composition it is possible to extrude the composite sheet with an extruder of simple construction.

BRIEF DESCRIPTION OF THE DRAWING

In the accompanying drawing, a single figure shows a side elevation, partly in section, of a hollow article utilizing a composite sheet of this invention.

DESCRIPTION OF THE PREFERRED EMBODIMENTS

The accompanying drawing shows a side view of a hollow article, for example, made of a composite sheet including an intermediate layer 1 and two outer layers 2 and 3 of the same composition, which are laminated and moulded simultaneously under heat.

To aid better understanding of the invention the following examples are given.

EXAMPLE 1

The intermediate layer was prepared by incorporating 5 parts of Surlyn A into 100 parts of EVAL ( trademark ) which is a copolymer of 30 percent of ethylene and 70 percent of vinyl alcohol and the outer layers 2 and 3 were prepared by incorporating 3 parts of Surlyn A into 100 parts of a low density polyethylene having a melt index of 2. The intermediate layer 1 and two outer layers 2 and 3 were extruded simultaneously with two extruders to obtain a laminated composite tube. Hollow parisons were then formed on the ends of the composite tube and the parisons were molded into the hollow articles by means of a conventional blow moulding machine. The resulting hollow container had a weight of about 20g and a volume of about 500cc. At the thinnest wall portion, the thickness of the outer layer was 0.15mm, that of the intermediate layer was 0.02mm and that of the inner layer was 0.18mm. The outer and inner layers 2 and 3 had the same composition. The permeability to oxygen of the container was 25 cc/$m^2$/day at a presence of one atmospheric pressure which is better than the data of 38 cc/$m^2$/day at the same pressure of a hollow container made of hard vinyl chloride and having a weight of 23g and a volume of 500cc. The bonding strength between the laminated layers was about 0.4kg/2cm. Said bonding strength between them in the case where Surlyn A ( trademark ) was not incorporated into both of the intermediate layer and the outer and inner layers was low, namely about 0.05kg/2cm.

EXAMPLE 2

The intermediate layer was prepared by incorporating two parts of Surlyn A into 100 parts of the same ethylene-vinyl alcohol copolymer as that used in Example 1 and the two outer layers were prepared by incorporating 5 parts of said ethylene-vinyl alcohol copolymer and 3 parts of Surlyn A into 100 parts of a low density polyethylene ( sold under a trademark of Yukaron ) having a melt index of 1.0 and a density of 0.92. The intermediate layer and two outer layers were extruded into a composite sheet and hollow articles each having a weight of about 20g and a volume of about 500cc were moulded in the same manner as in Example 1. At the thinnest wall portion, the ratio of the thickness of the outer layer 3, intermediate layer 1 and inner layer 2 was 6 : 1 : 5. The inner and outer layers had the same composition. The permeability to oxygen of the resulting container was 8 cc/$m^2$/day at a pressure of one atmospheric pressure which is better than the data of 20 cc/$m^2$/day at one atmospheric pressure of a hollow container having a weight of 19g and a volume of 460cc and made of vinylidene chloride. When the container was filled with water and sealed, the average weight loss after two months was 0.5 percent and the bonding strength between the laminated layers was 0.5kg/2cm on the average.

EXAMPLE 3

Like Example 1, the intermediate layer was prepared by incorporating 10 parts of an ethylene-vinyl acetate copolymer ( containing 10 percent of vinyl acetate ) into 100 parts of the ethylene-vinyl alcohol polymer used in Example 1, whereas the inner and outer layers were composed of a low density polyethylene ( sold under a trademark of Yukaron ) having a melt index of 1.0 and a density of 0.92. Hollow articles were prepared in the same manner as in Example 1. The resulting hollow container had a weight of about 21g and a volume of about 500cc. At the thinnest wall portion, the ratio of the outer layer 3, intermediate layer 1 and inner layer 2 was 9 : 1 : 8 and the inner and outer layers had the same composition. The permeability to oxygen of the resulting container was 29 cc/$m^2$/day at one atmospheric pressure and the bonding strength between the laminated layers was 0.25kg/2cm.

When burned under a proper condition, all of the polyolefins such as polyethylene and polypropylene which are used to form two outer layers, ethylene-vinyl alcohol copolymers utilized to enhance the barrier property, the ionomers such as Surlyn A and ethylene-vinyl copolymers which are used for the purpose of improving the bonding strength generate combustion gas essentially consisting of $H_2O$ and $CO_2$ which are non-poisonous thereby effectively solving the problem of processing the discards of plastics. Moreover, the composite sheet of this invention has a low permeability to gas and is moisture and sanitary. As the laminated layers are strongly bonded together, the composite sheet can be treated as if it consisted of a single layer. For this reason, the novel composite sheet is suitable to use as a packing sheet or a container for foodstuffs and various other materials.

What is claimed is:

1. A laminated composite sheet consisting essentially of an intermediate layer composed of a mixture of an ethylene-vinyl alcohol copolymer and a member selected from the group consisting of (1) an ethylene-vinyl acetate copolymer and (2) an ionomer which is a copolymer of a major proportion of ethylene and a minor proportion of acrylic acid neutralized by sodium ions or a copolymer of a major proportion of ethylene and a minor proportion of methacrylic acid neutralized by sodium ions; and two outer layers which have been coextruded with said intermediate layer and bonded to the opposite sides thereof, each of said outer layers being composed of a polyolefin selected from the group consisting of polyethylenes and polypropylenes or a blend of the polyethylenes or polypropylenes with the copolymers (1) or (2) described above.

2. A laminated composite sheet consisting essentially of an intermediate layer composed of an ethylene-vinyl alcohol copolymer and two outer layers which have been coextruded with said intermediate layer and bonded to the opposite sides thereof, each of said outer layers being composed of a polyolefin selected from the group consisting of polyethylenes and polypropylenes, at least one of said outer layers being blended with a member selected from the group consisting of (1) an ethylene-vinyl acetate copolymer and (2) an ionomer which is a copolymer of a major proportion of ethylene and a minor proportion of acrylic acid neutralized by sodium ions or a copolymer of a major proportion of ethylene and a minor proportion of methacrylic acid neutralized by sodium ions.

3. A laminated composite sheet according to claim 1, wherein each of said outer layers is a blend of polyethylene or polypropylene with the copolymers (1) or (2) as described in claim 1.

4. The laminated sheet according to claim 1, wherein said intermediate layer consists of a mixture of 100 parts, by weight, of an ethylene-vinyl alcohol copolymer and from 1 to 30 parts, by weight, of the copolymers (1) or (2) as described in claim 1.

5. The laminated sheet according to claim 1, wherein said outer layers consist of a mixture of 100 parts, by weight, of a polyolefin selected from the group consisting of polyethylenes and polypropylenes and from 0.1 to 15 parts, by weight, of the copolymers (1) or (2) as defined in claim 1.

6. A laminated sheet according to claim 4, wherein the intermediate layer is composed of an ethylene-vinyl alcohol copolymer containing 30 percent of ethylene and 70 percent of vinyl alcohol and wherein the copolymer (1) is an ethylene-vinyl acetate copolymer containing about 10 percent of vinyl acetate and the copolymer (2) is an ionomer composed of 96 percent of ethylene and 4 percent of the acrylic or methacrylic acid neutralized with sodium ions.

7. A laminated sheet according to claim 5, wherein the copolymer (1) is an ethylene-vinyl acetate copolymer containing about 10 percent of vinyl acetate and the copolymer (2) is an ionomer composed of 96 percent ethylene and 4 percent of an acrylic or methacrylic acid neutralized with sodium ions.

8. A hollow container having a wall made of a laminated materials as defined in claim 1.

9. A hollow container having a wall made of a laminated materials as defined in claim 2.

* * * * *